Jan. 22, 1957

E. L. MALONE 2,778,174

METHOD OF AND APPARATUS FOR ASSEMBLING
ROD-LIKE STRUCTURAL MEMBERS

Filed July 14, 1953

INVENTOR.
Erwin L. Malone.
BY
E. J. Balluff
ATTORNEY.

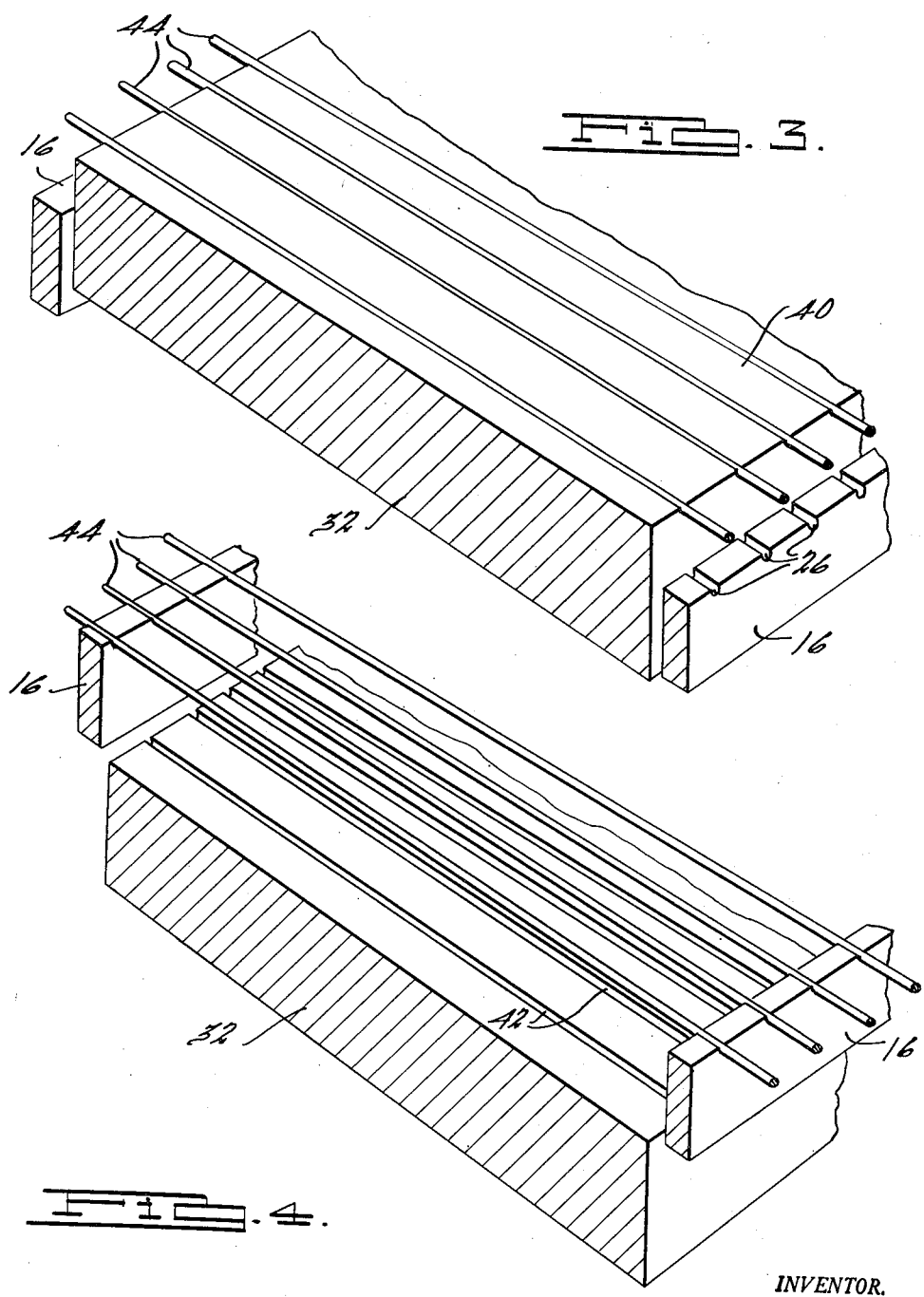

United States Patent Office 2,778,174
Patented Jan. 22, 1957

2,778,174

METHOD OF AND APPARATUS FOR ASSEMBLING ROD-LIKE STRUCTURAL MEMBERS

Erwin L. Malone, Maplewood, N. J., assignor to Wall Wire Products Company, Plymouth, Mich., a corporation of Michigan Application July 14, 1953, Serial No. 367,926

10 Claims. (Cl. 53—35)

This invention relates to a method of and apparatus for assembling rod-like elements in spaced relation as a part of an assembly process, and has particular reference to such an apparatus which is useful for arranging a series of elongated small diameter rods in spaced relation in a rod-holding fixture so that other operations, such as welding or the like, may later be performed on the assembled rods.

In the embodiment of the invention selected for purposes of illustration, the rod-holding fixture is in the form of a pair of substantially rectangular open frames hinged together, each of the hinged frames being provided at opposite side edges thereof with rod-holding provisions in the form of aligned notches adapted to receive the ends of the rods for supporting the rods in the desired spaced relation. The illustrated rod-holding fixture has been used in the manufacture of articles such as condensers in which the fins in the form of a grid of wires or rods are welded on opposite sides of a length of tubing of appropriate form which is sandwiched between the grids. It is apparent that the invention may be used in a great many other applications where it is necessary to arrange a plurality of wires or rods in spaced relation within a fixture.

It has heretofore been proposed to employ automatic feeding devices, such as hoppers, containing a number of the rods and adapted to feed them indiviudally into the rod-holding provisions on the fixture as the fixture is moved beneath the hopper. Such devices have not proven entirely satisfactory since they are subject to jamming and do not always feed a single rod into each locating groove, especially when using elongated, relatively small diameter rods. In addition, such rod-hoppers are often very expensive and complicated mechanisms and result in increased cost of manufacture. The process of filling fixtures by hand by laying the wires individually into the rod-holding provisions on the two sides of the fixture is laborious and time-consuming and results in high labor cost and consequently in an expensive operation. No satisfactory solution to the foregoing problems has heretofore been proposed, so far as I am aware.

The present invention is concerned with an apparatus and method by means of which the fixture may be filled with rods or wires in a very efficient and inexpensive manner and in much less time than is possible with operations now employed. The apparatus consists essentially of a locating fixture on which the rods may quickly be arranged in the desired spaced relation by a simple manual operation, and the locating fixture is then lowered through the rod-holding fixture to locate the rods in the holding fixture. The invention also contemplates a novel method of arranging rods in spaced relation in a rod-holding fixture.

A principal object of the invention therefore is to provide a new and improved apparatus for assembling a plurality of rods or wires in spaced relation.

Another object of the invention is to provide a new and improved method of arranging a series of rods in spaced relation.

A further object of the invention is to provide an apparatus and method of the type described which greatly reduces the labor and cost of assembling elongated structural elements in a holding fixture.

Other and further objects of the invention will be apparent from the following description and claims and may be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 3 is an enlarged fragmentary perspective view of the apparatus; and

Fig. 4 is an enlarged fragmentary perspective view similar to Fig. 3 but showing the locating fixture in its lowered position.

Figure 1:
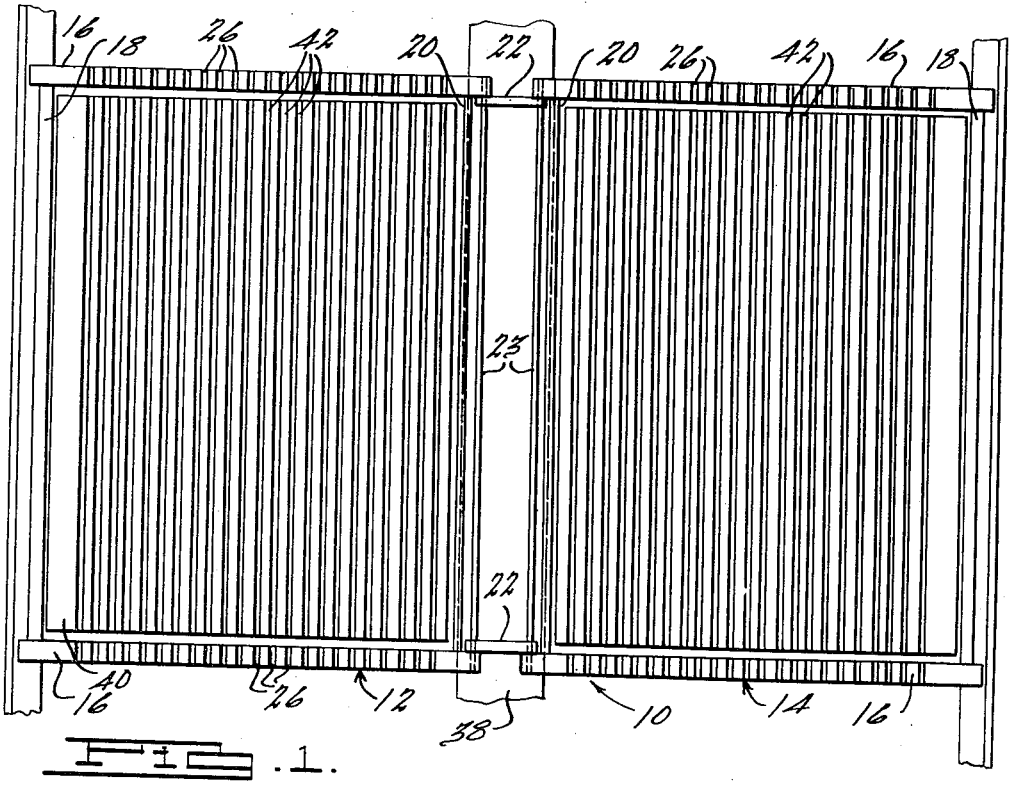
Fig. 1 is a top plan view of the assembly apparatus of this invention.

Referring more particularly to the drawings, in Fig. 1 there is disclosed a rod-holding fixture 10 which comprises two sections 12 and 14 hinged together at their adjacent edges. Each of the sections 12 and 14 comprises a substantially rectangular, open frame including sides 16 joined together by suitable cross frame members such as members 18 and 20. The adjacent ends of the sides 16 are hinged to plates 22 by means of shafts 23 so as to permit one of the sections of the fixture to be folded over into superposed relation to the other of the sections.

Figure 2:
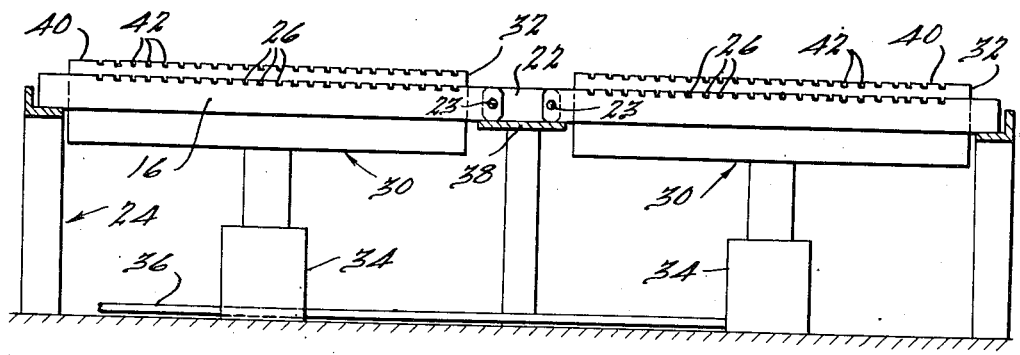
Fig. 2 is a side elevational view of the apparatus shown in Fig. 1.

Hinged fixtures of the type described above may be useful in assembling a plurality of wires or rods in the form of a grid to the opposite sides of a length of tubing to form a condenser or the like. The wires may be welded or otherwise secured to the opposite sides of the tubing while the tube is clamped between the two grids of wire when the fixture is folded as described. The fixture is shown as being disposed on a track 24 for movement of the fixture to various stations at which different operations may be performed in the assembly process. In such event the track 24 is arranged to support the fixture in the open position thereof shown in Figs. 1 and 2 so that a series of rods may be arranged in each of the sections 12 and 14 when the fixture is moved to a certain station on the track 24. It will be apparent that a single section of the fixture may be employed in many applications of the invention, rather than the hinged fixture disclosed.

The side frame members 16 are provided with a series of rod-holding provisions on their upper surfaces in the form of spaced parallel notches 26 which are adapted to receive the ends of the rods which are to be assembled. A locating fixture indicated generally at 30 is disposed beneath the track and consists of a locating block 32 and elevating means 34 for raising and lowering the block 32. The elevating means 34 is illustrated in the form of a fluid pressure operated piston and cylinder device supplied with fluid pressure through line 36, although any suitable mechanical or manually operable elevating means may be employed. One of such locating fixtures 30 is arranged beneath the track on either side of the central portion 38 thereof.

The locating block 32 comprises a substantially rectangular block which may be made of wood, plastic, metal or other material and the upper surface thereof is substantially horizontal and is provided with rod-locating means which may consist of a series of spaced, parallel grooves 42 extending completely across the block in the manner shown. The grooves 42 are adapted to be aligned with the notches 26 formed on the upper surfaces of the sides 16 of the fixture. The block 32 is slightly smaller in size than the sections 12 and 14 of the fixture 10 so as to be movable vertically through the fixture between the sides 16 thereof. When the locating blocks 32 are in the elevated position shown in Figs. 2 and 3, the rods 44 are arranged in the grooves 42. Each groove 42 is shown as being slightly greater in depth and width than the diameter of the rods 44 so that only one rod 44 can be arranged in each groove. In some applications, however, it may be desired to arrange two or more of the rods in each groove, and in which case the grooves would be correspondingly shaped. It will also be apparent that in some operations where it is desired to arrange rods in criss-cross or other relation, another series of grooves may be arranged on the upper surface of locating block 32 and corresponding rod-holding provisions provided on the fixture 10. The rods 44 may be arranged in the grooves 42 in the novel manner herein described, preferably manually, or by a mechanical means.

A bundle of individual rods 44 may be grasped by an operator and laid on the upper surface 40 of the locating block 32 when the same is in its elevated position. Movement of the bundle of rods across and in contact with the upper surface 40 of the block 32 with the rods disposed parallel to the grooves 42 will effect insertion of a rod in each of the grooves 42 if the rods are clasped and held in such manner as to permit individual rods to fall from the bundle into a groove as the bundle is moved across the surface of the block. This can be done by confining and moving the bundle of rods by the palms of the hands and fingers from one side to the other of surface 40, or in the event a mechanical device is employed, it would be necessary to confine the bundle of rods within the device in such manner that individual rods could fall out of the bundle into the grooves as the bundle is moved over the surface. It has been found in actual practice that the locating block 32 may be filled with rods by the manual operation just described with a great saving of time and labor and at substantially reduced equipment cost.

The rods 44 are longer than the grooves 42 and project laterally beyond the sides of the block 32 in the manner shown in Fig. 3, and the grooves 42 are aligned with the notches 26 formed on the sides 16 of the fixture, so that the projecting ends of the rods 44 will be located directly above the notches 26 when the block 32 is loaded with rods in its elevated position. Lowering of the locating fixture 30 from such position will lower the rods 44 until the projecting ends thereof seat in the notches 26 as shown in Fig. 4, thereby disengaging the rods from the locating block 32. The rods are then properly located within the holding fixture 10 and the fixture may be moved to another station for further operations to be performed on the assembled rods as desired.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. In an apparatus for locating a series of elongated rods in spaced relation, a fixture provided with spaced frame members having rod-holding provisions on their upper surfaces, a locating block having a substantially horizontal upper surface provided with a series of grooves therein extending from one end of said block to the other end thereof, the length of said grooves being less than the length of the rods, said block being movable vertically between said frame members to an upper position in which rods may be arranged in said grooves and movable therefrom to a lower position to disengage the rods from said grooves while positioning the ends of the rods in the rod-holding provisions of said fixture.

2. In an apparatus for locating a series of rods in spaced relation, a fixture having rod-holding provisions at opposite sides thereof, a locating block having an upper surface provided with a series of spaced grooves therein extending across said surface from one side edge of said surface to another side edge thereof, the length of said grooves being less than the length of the rods, said block being movable vertically within said fixture to a position in which the upper surface thereof is disposed above said rod-holding provisions on the fixture whereby the rods may be arranged in said grooves, and means for lowering said block from said one position to locate the ends of the rods in said rod-holding provisions.

3. In an apparatus for locating a series of rods in spaced relation, a rod-holding fixture provided with spaced frame members having spaced rod-holding provisions on their upper surfaces adapted to receive the ends of the rods, a locating fixture having a substantially horizontal locating surface adapted to support the rods in spaced relation with the ends of the rods projecting laterally beyond said surface, said locating fixture being adapted to be disposed between said frame members in a position in which said locating surface is disposed above said frame members to permit rods to be positioned thereon in alignment with said rod-holding provisions on said fixture, and means for effecting relative vertical movement of said locating fixture and said holding fixture from said one position to permit engagement of the ends of the rods with the rod-holding provisions on said frame members and thereby disengage the rods from said locating surface.

4. Apparatus for locating a series of elongated small diameter rods in spaced relation comprising a rod-holding fixture provided at opposite sides thereof with provisions for supporting the ends of the rods, a track, a locating block beneath said track and having its upper surface formed to support a series of rods with the ends of the rods projecting laterally beyond said upper surface, said fixture being movable along said track to a position above said block, means for moving said block vertically between the sides of said track and within said fixture to a position in which said upper surface is disposed above the rod-holding provisions of said fixture to permit rods to be positioned on said surface, and means for lowering said block from said one position to permit the ends of the rods to seat in the rod-holding provisions of said fixture thereby to disengage the rods from said block.

5. In an apparatus for locating a series of elongated, small diameter rods in spaced relation, a rod-holding fixture comprising a substantially rectangular open framework having rod-holding provisions at opposite sides thereof, a locating block having a substantially horizontal upper surface provided with a series of spaced grooves therein extending from one side edge of said surface to an opposite side edge thereof, the length of said grooves being less than the length of the rods, said block being movable vertically through said framework to a position in which the upper surface thereof is disposed above said rod-holding provisions whereby movement of a bundle of rods across and in contact with said upper surface with the rods disposed parallel to said grooves will effect insertion of a rod in each groove, and means for lowering said block from said one position whereby the ends of said rods will seat in the rod holding provisions of said fixture.

6. In an apparatus for locating a series of elongated, small diameter rods in spaced relation, a fixture provided at opposite sides thereof with provisions for supporting the rods at their ends and in spaced relation, and a locating block movable vertically within said fixture for selectively positioning the upper surface of the block above or below the rod-holding provisions on said fixture, said upper surface having locating means thereon for locating a series of rods in said spaced relation in vertical alignment with said rod-supporting provisions on said fixture and with the ends of the rods projecting laterally beyond said surface.

7. In an apparatus for locating a series of elongated structural members in spaced relation, a fixture having supporting provisions spaced along opposing sides thereof for supporting the members at their ends, and a locating block movable vertically within said fixture for selectively positioning the upper surface of the block above or below the supporting provisions on said fixture, said upper surface having locating means thereon for locating a series of said members in spaced relation when said block is in its upper position with the ends of said members projecting laterally therefrom and with each end of each of said members disposed directly above one of the supporting provisions of said fixture.

8. Apparatus according to claim 7 wherein said locating means on said upper surface of said locating block comprise a series of spaced, parallel grooves each extending completely across said surface and having a depth at least as great as the thickness of the structural members.

9. The method of filling a holding fixture having rod-holding provisions thereon adapted to receive the ends of a series of rods, which comprises positioning said holding fixture above a locating fixture provided with locating means on its upper surface, raising said locating fixture to a position in which said upper surface is above said rod-holding provisions, moving a bundle of rods across and in contact with said surface in such manner that individual rods may fall from the bundle into the locating means, and lowering the locating fixture to a position in which said upper surface is disposed below said rod-holding provisions.

10. The method of filling a holding fixture having rod-holding provisions thereon adapted to receive the ends of a series of elongated small diameter rods, which comprises positioning a locating fixture above said holding fixture, arranging rods in spaced relation on the upper surface of said locating fixture with the ends projecting therefrom and with each rod disposed directly above a rod-holding provision of said holding fixture, and lowering the locating fixture to position the ends of said rods in the rod-holding provisions of said holding fixture.

References Cited in the file of this patent

UNITED STATES PATENTS

| | | |
|---|---|---|
| 1,641,078 | Frust | Aug. 30, 1927 |
| 1,825,058 | Goldstein et al. | Sept. 29, 1931 |
| 2,613,861 | Goerlitz | Oct. 14, 1952 |
| 2,635,729 | Drake | Apr. 21, 1953 |
| 2,717,801 | Neil | Sept. 13, 1955 |